United States Patent [19]

Cohn

[11] 4,083,004
[45] Apr. 4, 1978

[54] EXPENDABLE REPEATER EMPLOYING HARMONIC MIXING

[75] Inventor: Marvin Cohn, Baltimore, Md.

[73] Assignee: Westinghouse Electric Corporation, Pittsburgh, Pa.

[21] Appl. No.: 693,987

[22] Filed: Jun. 8, 1976

[51] Int. Cl.² .............................................. H04B 7/14
[52] U.S. Cl. ............................................. 325/6; 325/1; 343/6.8 R
[58] Field of Search ......................... 325/1, 6, 8, 9, 10, 325/11, 12, 13; 343/6.8 R, 18 E

[56] References Cited

U.S. PATENT DOCUMENTS

| | | | |
|---|---|---|---|
| 2,228,815 | 1/1941 | Deerhake | 325/11 |
| 2,369,268 | 2/1945 | Trevor | 325/11 |
| 2,489,273 | 11/1949 | Dodington | 325/6 X |
| 2,561,363 | 7/1951 | Haeff et al. | 325/13 X |
| 2,671,850 | 3/1954 | Marcou | 325/11 |
| 2,674,692 | 4/1954 | Cutler | 325/9 X |
| 3,113,268 | 12/1963 | Horak | 325/6 |
| 3,127,603 | 3/1964 | Kramer | 325/13 X |

Primary Examiner—Richard Murray
Attorney, Agent, or Firm—H. W. Patterson

[57] ABSTRACT

An expendable signal repeater for transmitting a replica of received signals in which the received signals are converted to an intermediate frequency by mixing in a down-converter with an upper harmonic of a heterodyning signal provided by a local oscillator; the intermediate frequency signals are delayed; and the delayed, intermediate frequency signals are converted to the transmitted signal by mixing in an up-converter with the upper harmonic of the amplified, local oscillator heterodyning signal. A mechanism is provided for switching the local oscillator between the down-converter and the up-converter during the delay of the intermediate frequency signals to prevent feedback of the transmitted signal.

11 Claims, 2 Drawing Figures

EXPENDABLE REPEATER EMPLOYING HARMONIC MIXING

CROSS REFERENCES TO RELATED APPLICATIONS

An example of a down-converter and an up-converter used in the signal repeater of the present invention is described in the copending U.S. Patent Application entitled "Harmonic Mixing With an Anti-Parallel Diode Pair", Ser. No. 552,020, filed Feb. 24, 1975 by Marvin Cohn, which is incorporated herein by reference for a more detailed description thereof.

BACKGROUND OF THE INVENTION

1. Field of the Invention

The present invention relates to signal repeaters and, more particularly, to expendable signal repeaters for use in unattended radar applications.

2. Description of the Prior Art

In the prior art, it has been recognized that it would be useful to deploy signal repeaters over a given terrain for the purpose of confusing radar sets interrogating that terrain, causing them to detect targets which, in fact, did not exist. Typically, these repeaters would receive the signals transmitted by the interrogating radar set, delay them for a time, and transmit them back to the radar set at a higher amplitude causing the radar to detect a relatively large target at a more distant range than the true range of the signal repeater. To take advantage of the utility of amplifying these signals at lower frequencies than the radio frequencies of signals transmitted by the radar, the prior art signal repeaters typically converted the radio frequency of received signals to an intermediate frequency by mixing the signals with the fundamental frequency of a local oscillator. Since the receiver and transmit antennas of these repeaters were usually disposed close together and usually had isotropic antenna patterns, switching mechanisms were developed for switching the local oscillator between the down-converter and the up-converter.

However, to achieve an intermediate frequency suitable for amplification, the fundamental frequency of the local oscillator signal could be no less than the difference of the radio frequency of a received signal, less the desired intermediate frequency. Therefore, the local oscillator signal was, itself, a radio frequency signal. To provide an appropriately amplified transmission signal, the power level of the repeater's local oscillator had to be substantially higher than the power of the transmitted signal. Unfortunately, such high power local oscillators, capable of operating at high microwave frequencies, are relatively inefficient and expensive in comparison to high power local oscillators operating at lower frequencies. For example, a local oscillator operating at 6 Gigahertz is less efficient and more expensive than a local oscillator operating at 3 Gigahertz. The inefficiency of prior art repeaters employing local oscillators operating at relatively high microwave frequencies affected the cost and useful life of the repeater by shortening the life of the repeater power source and requiring larger, more expensive, power sources.

Where it was desired to deploy such repeaters over hostile terrain which did not admit to convenient maintenance and removal, it was recognized that an expendable repeater, which would be abandoned at the termination of its useful life, would be highly suited for such applications. However, due to the requirements of the local oscillator, the cost and the complexity of the prior art repeaters made them too unreliable and expensive to be considered for such unattended, expendable use. There was, therefore, a need for an inexpensive, reliable repeater having a long operating life and which was suitable for expendable use.

SUMMARY OF THE INVENTION

A signal repeater provides a transmitted signal in response to a received signal by mixing the received signal with an upper harmonic of the fundamental frequency of the heterodyning signal of an oscillator in a down-converter to provide an intermediate frequency signal, amplifying and delaying the intermediate frequency signal, and mixing the amplified intermediate frequency signal with an upper harmonic of the fundamental frequency of the amplified heterodyning signal of the oscillator. The down-converter and the up-converter mix the received signal and the intermediate frequency signal respectively with an upper harmonic of the fundamental frequency of the heterodyning signal to permit efficient frequency conversion while utilizing a heterodyning signal of relatively low fundamental frequency. The low fundamental frequency of the heterodyning signal permits the use of an efficient local oscillator and an efficient amplifier for amplifying the heterodyning signal provided to the up-converter.

DESCRIPTION OF THE PREFERRED EMBODIMENT

Figure 1:
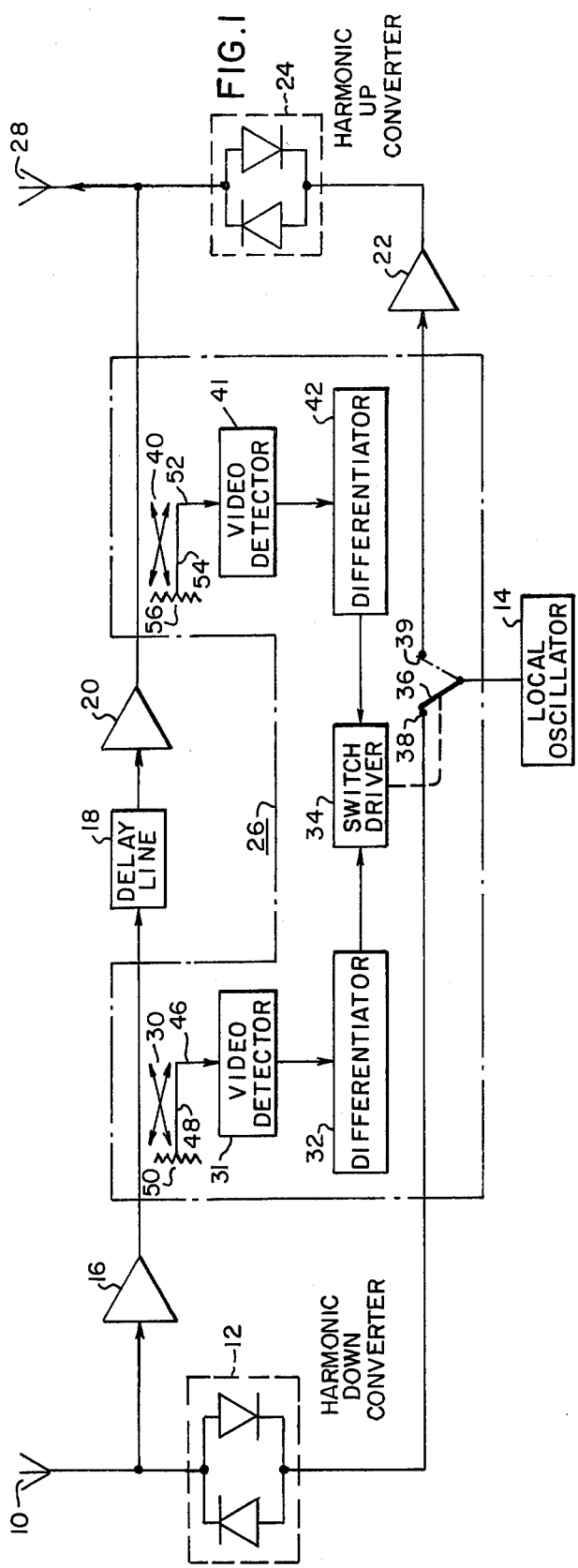
FIG. 1 is a block diagram of the preferred embodiment of the disclosed signal repeater.

FIG. 1 shows the preferred embodiment of the expendable signal repeater which comprises the present invention. Generally, the signals transmitted by an interrogating radar set (not shown) are received by the radar antenna 10 and mixed in the harmonic down-converter 12 with the heterodyning signal provided by a local oscillator 14 to provide an intermediate frequency signal which is more suitable for amplification and processing than the radio frequency signals received by the antenna 10. The intermediate frequency signal provided by the harmonic down-converter 12 is amplified in an amplifier 16, delayed for a predetermined time in the delay line 18, again amplified in an amplifier 20 and mixed with the heterodyning signal of the local oscillator 14, amplified by the oscillator amplifier 22, in a harmonic up-converter 24 to provide an amplified, time delayed transmitting signal to an antenna 28 from which it is propagated back to the interrogating radar set. The high amplitude, time delayed, transmitted signal which is received by the interrogating radar set causes the radar to detect the presence of a non-existent target at a point down-range from the actual location of the signal repeater. To prevent the feedback which would occur due to the close disposition and isotropic patterns of antennas 10 and 28 if the harmonic down-converter 12 were operative while the harmonic up-converter 24 was transmitting, and to obviate the problem of near clutter returns from being interpreted as signals from an interrogating radar set, a switching apparatus within the dashed lines 26 is provided for disconnecting the local oscillator 14 from the harmonic down-converter 12 after a signal has been received and an intermediate frequency signal produced, and for disconnecting the local oscillator 14 from the harmonic up-converter 24 and reconnecting it to the harmonic down-converter 12 after a transmitting signal has been provided by the harmonic up-converter 24. Equivalently, therefore, the two antennas 10 and 28 could be replaced by a signal antenna which was connected to the harmonic down-converter 12 and to the harmonic up-converter 24 through a circulator.

In a more detailed description of the preferred embodiment, the antenna 10 receives signals propagating in space and provides these to the harmonic down-converter 12 which converts the frequency of the received signals by mixing the received signals with an upper harmonic of the fundamental frequency of a heterodyning signal provided by a local oscillator 14 through the switch apparatus 26. Such harmonic mixing as occurs in harmonic down-converter 12 is described in an article entitled "Harmonic Mixing With An Anti-Parallel Diode Pair" by M. Cohn, J. E. Degenford and B. A. Newman which was published in IEEE Transactions on Microwave Theory and Techniques, Volume MTT-23, No. 8, August, 1975 and which is incorporated herein by reference for a more detailed description thereof. The harmonic mixing is also described in the copending U.S. Patent Application entitled "Harmonic Mixing With An Anti-Parallel Diode Pair", Ser. No. 552,020, filed Feb. 24, 1975 by Marvin Cohn. Briefly, the harmonic down-converter 12 employs an anti-parallel diode pair circuit which provides outputs only for half the mixing products of the input signals. The harmonic mixer utilizes an anti-parallel configuration of two diodes which are excited by a voltage waveform $V_{LO}\sin \omega_{LO}t + V_s\sin \omega_s t$ in which $V_{LO}$ and $V_s$ represent the amplitude of local oscillator and input signals respectively and $\omega_{LO}$ and $\omega_s$ represent the frequency of the local oscillator and input signals respectively, where $V_{LO}$ is much greater than $V_s$. The anti-parallel diode configuration yields an output having angular frequency components $m\omega_{LO} \pm n\omega_s$ with the restriction that $m + n$ is an odd integer. The anti-parallel diode configuration results in low conversion loss mixing when the local oscillator frequency is a subharmonic of the local oscillator frequency usually required. The diode configuration also suppresses local oscillator noise sideband effects without the use of filters or hybrid junctions, and suppresses direct video detection.

Since the harmonic down-converter 12 mixes the received signal with an upper harmonic of the fundamental frequency of the heterodyning signal provided by the local oscillator 14, the local oscillator may provide a heterodyning signal of a lower fundamental frequency than local oscillator used in the prior art repeaters. This permits the use of a local oscillator comprised of power transistors in the signal repeater of the present invention as opposed to two terminal, avalanche or Gunn diode devices or transistor devices followed by harmonic generators as used in signal repeaters of the prior art. Threfore, the local oscillator 14 of the preferred embodiment will be less expensive and more efficient than the local oscillators of the prior art.

The harmonic down-converter 12 provides an intermediate frequency signal, hereinafter IF signal, to the amplifier 16 to increase the amplitude of the IF signal. The output of the amplifier 16 is provided to the switching apparatus 26 to switch the heterodyning signal of the local oscillator 14 from the harmonic down-converter 12 to the local oscillator amplifier 22 which provides the amplified heterodyning signal of the local oscillator 14 to the harmonic up-converter 24.

After the intermediate frequency signal amplified by the amplifier 16 causes the switching apparatus 26 to transfer the heterodyning signal provided by the local oscillator 14 to the harmonic up-converter 24, the amplified IF signal is provided to the delay line 18. The delay line 18 is comprised of a piezoelectric material and operates to produce a time delay in the propagation of the signal between its input terminal and output terminal which is set to be equal to or greater than the longest expected pulse length of a pulse of a signal received by the repeater. This time delay serves the purpose of delaying the transmission of an output signal from the repeater to the interrogating radar which had transmitted the signals received by the antenna 10 beyond the normal delays incurred in the processing of the signal to cause the radar to inaccurately determine the range of the repeater. Also, the delay line 18 serves to afford the switching apparatus 26 a time period in which to switch the output of the local oscillator 14 from the harmonic down-converter 12 to the harmonic up-converter 24 after the reception of a pulse by the antenna 10.

The output of the delay line 18 is provided to the second intermediate frequency amplifier 20, hereafter second IF amplifier 20, for further amplification of the intermediate frequency signal. The output of the IF amplifier 20 is provided to the switching apparatus 26 to cause the local oscillator heterodyning signal to be disconnected from the local oscillator amplifier 22 and the harmonic up-converter 24, and to be returned to the harmonic down-converter 12. After the switching apparatus 26 has initiated this switching process in response to the output of the IF amplifier 20, the output of the IF amplifier 20 is provided to the harmonic up-converter 24. Because the response of the switching apparatus 26 is slower than the transmission of the output of the IF amplifier 20 to the harmonic up-converter 24, the propagation of the transmitted signal will be realized before the heterodyning signal of the local oscillator 14 is switched from the local oscillator amplifier 22 to the harmonic down-converter 12.

The harmonic up-converter 24 performs substantially the inverse operation of the harmonic down-converter 12 and mixes the IF signal provided by the IF amplifier 20 with the heterodyning signal of the local oscillator 14 which has been amplified by the local oscillator amplifier 22 to provide a transmitting signal to the antenna 28 from which the signal is propagated through space. Similar to the harmonic down-converter 12, the harmonic up-converter 24 may be constructed from the teachings of the previously cited publication and copending patent application which deal with harmonic mixing with an anti-parallel diode pair. If the power level of the transmitted signal is low enough, typically less than 10 milliwatts, the harmonic up-converter 24 may employ the use of mixer diodes. For higher power levels, the harmonic up-converter 24 is comprised of varactor diodes used in a parametric up-converter. Because the fundamental frequency of the heterodyning signal of the local oscillator 14 is considerably lower than the fundamental frequency of the prior art local oscillators, the local oscillator amplifier 22 is more efficient than the harmonic generators used as amplifiers in the prior art.

Figure 2:
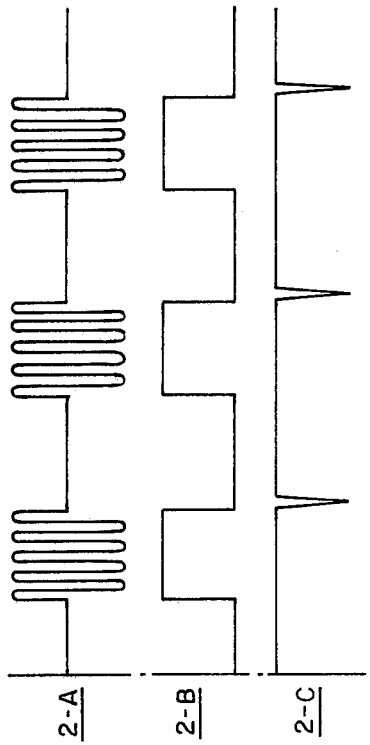
FIG. 2 represents typical waveforms which could occur at various points in the signal repeater of FIG. 1 during its operation.

The switching apparatus 26 includes a first directional coupler 30, a first video detector 31, a first differentiator 32, a second directional coupler 40, a second video detector 41, a second differentiator 42, a switch driver 34 and a two position switch 36. The first directional coupler 30 is provided with conjugate outputs 46 and 48 and a terminating resistor 50 connected to the conjugate output 48. The directional coupler 40 includes conjugate outputs 52 and 54 and a terminating resistor 56 for terminating the output 54. In the operation of the switching mechanism 26, the directional coupler 30 provides a small portion of the output of the amplifier 16 to the video detector 31 through the output 46. A typical output signal for the amplifier 16, and, therefore, the output signal of the output 46 of the directional coupler 30, is shown as waveform 2-A of FIG. 2. The video detector 31 provides an output signal which is the envelope of the IF output of the directional coupler 30, and which in response to the waveform 2-A would appear as the waveform 2-B of FIG. 2. The differentiator 32 provides a negative pulse in response to the trailing edge of a pulse provided by the video detector 31 thereby detecting the end of the received pulse. For the output of the directional coupler 30 shown as wavform 2-A of FIG. 2, and the output of the video detector 31 shown as waveform 2-B, the output of the differentiator 32 would be shown as waveform 2-C of FIG. 2. Th switch driver 34, comprised of a flip-flop circuit, is responsive to the pulse outputs of the differentiator 32 to cause the switch 36, comprised of a solid state, transistor type switch, to be transferred from a position symbolically indicated by the solid line 38, in which the local oscillator 14 is operative to the harmonic down-coverter 12 for providing IF signals to the amplifier 16 in response to signals received by the antenna 10, to a position symbolically indicated by the dashed line 39 in which the local oscillator 14 is operative with the local oscillator amplifier 22 and the harmonic up-converter 24 to provide a transmission signal to the antenna 28 in response to an IF signal from the amplifier 20. When the switch 36 is in the position indicated by the dashed line 39 and is no longer operative with the harmonic down-converter 12, the harmonic down-converter 12 will provide no IF signal to the amplifier 16 thereby eliminating the possibility of feedback from the signal transmitted by antenna 28.

In a manner similar to the operation of the directional coupler 30, the directional coupler 40 provides a relatively small portion of the output signal of the amplifier 20 through output 52 to the video detector 41. The directional coupler 40, the video detector 41, and the differentiator 42 are substantially equivalent to the directional coupler 30, the video detector 31 and the differentiator 32 respectively so that, for the output of amplifier 20 illustrated by the waveform 2-A of FIG. 2, the output of the directional coupler 40 is also illustrated by the waveform 2-A of FIG. 2, the output of the video detector 41 is illustrated by waveform 2-B, and the output of the differentiator 42 is illustrated by the waveform 2-C of FIG. 2. The switch driver 34 is also responsive to the differentiator 42 and upon receiving a pulse from the differentiator 42, transfers the position of the switch 36 from the position indicated by the dashed line 39 to the position indicated by the solid line 38. Once local oscillator 14 is again made operative with the harmonic down-converter 12 the signal repeater is prepared to duplicate the next signal received by the antenna 10 so that, except for the brief period in which it is processing and transmitting a signal, the disclosed repeater will be in a ready condition. Therefore, the disclosed repeater will have a high duty cycle.

It will be apparent to those skilled in the art that, in addition to the high efficiency by virtue of the operation of the down-converter 12 and the up-converter 24, the disclosed repeater will also be more efficient in that the local oscillator 14 is operative with the local oscillator amplifier 22 only during the time in which a transmitted signal is to be produced. While the repeater is waiting for the next received signal, the local oscillator 14 is operative only with the harmonic down-converter 12. Accordingly, since the local oscillator amplifier 22 is not continuously operative, the power supply for the amplifier 22 will require less capacity per unit of operating time for the signal repeater than for prior art repeaters in which the heterodyning signal of the local oscillator was continuously amplified.

In summary, the operation of the disclosed unattended, expendable repeater is as follows. The local oscillator 14 is normally operative with the harmonic down-converter 12 through the switch 36 so that a low level signal can be received by the antenna 10 and down-converted by the down-converter 12. When the differentiator 32 detects the trailing edge of the envelope of the pulsed signal provided by the harmonic down-converter 12 through the amplifier 16, the switch driver 34 is triggered and the output of the local oscillator 14 is connected to the up-converter 24 through the switch 36. The time delay of the delay line 18 is set to be equal to or greater than the longest expected pulse length of the received signal so that the up-converter 24 is energized with the local oscillator output prior to the arrival of the leading edge of the pulse. When the differentiator 42 senses the trailing edge of the pulse, the differentiator 42 activates the switch driver 34 to reconnect the output of the local oscillator 14 to the down-converter 12. The unattended repeater is then ready to receive another pulse of the antenna 10.

I claim:

1. A signal repeater for providing a transmitted signal in response to a received signal, said repeater comprising:

an oscillator for providing a heterodyning signal;
   means for down-converting the received signal by mixing the received signal with a harmonic of the fundamental heterodyning signal of said oscillator to provide an intermediate frequency signal;
   means for delaying the propagation of said intermediate frequency signal for a predetermined time;
   means for up-converting the intermediate frequency signal by mixing the intermediate frequency signal with a harmonic of the heterodyning signal of said oscillator to provide the transmitted signal having a frequency which is substantially equal to the frequency of the received signal; and
   means for switching the heterodyning signal of said oscillator between said down-converting means and said up-converting means in response to the propagation of said intermediate frequency signal between said down-converting means and said up-converting means.

2. The signal repeater as claimed in claim 1 further comprising:

a first amplifier for amplifying the intermediate frequency signal of said down-converting means before it is provided to said delaying means; and a second amplifier for amplifying the intermediate frequency signal delayed by said delaying means before it is provided to said up-converting means.

3. The signal repeater as claimed in claim 1 further comprising:
an oscillator amplifier for amplifying the heterodyning signal provided to said up-converting means.

4. The apparatus of claim 3 in which said oscillator amplifier is comprised of a Class C type amplifier.

5. The signal repeater as claimed in claim 1 in which said down-converting means mixes the received signal with an even harmonic of the heterodyning signal of said oscillator; and in which said up-converting means mixes the intermediate frequency signal with an even harmonic of the heterodyning signal of said oscillator.

6. The signal repeater as claimed in claim 5 in which said down-converting means is comprised of an anti-parallel diode pair mounted across a waveguide.

7. The signal repeater as claimed in claim 6 in which said up-converting means is comprised of an anti-parallel diode pair mounted across a waveguide.

8. The signal repeater as claimed in claim 6 in which said up-converting means is comprised of an anti-parallel varactor diode pair mounted across a waveguide.

9. A signal repeater for providing a transmitted signal in response to a received signal, said repeater comprising:
an oscillator for providing a heterodyning signal;
means for down-converting the received signal by mixing the received signal with a harmonic of the heterodyning signal of said oscillator to provide an intermediate frequency signal;
a first amplifier for amplifying the intermediate frequency signal of said down-converting means;
means for delaying the propagation of said intermediate frequency signal amplified by said first amplifier for a predetermined time;
a second amplifier for amplifying the intermediate frequency signal delayed by said delaying means;
an oscillator amplifier for amplifying the heterodyning signal;
means for up-converting the intermediate frequency signal amplified by said second amplifier by mixing the amplified, intermediate frequency signal with a harmonic of the heterodyning signal amplified by said oscillator amplifier to provide the transmitted signal having a frequency which is substantially equal to the frequency of the received signal; and
means for switching the heterodyning signal of said oscillator between said down-converting means and said oscillator amplifier in response to the propagation of said intermediate frequency signal between said down-converting means and said up-converting means.

10. The apparatus of claim 9 in which said switching means comprises:
a first directional coupler providing an output in response to the output of said first amplifier;
a first video detector for providing the envelope of the output of said first directional coupler;
a first differentiator for providing an output signal which is representative of the differential of the output of said first video detector;
a second directional coupler providing an output in response to the output of said second amplifier;
a second video detector for providing the envelope of the output of said second directional coupler;
a second differentiator for providing an output signal which is representative of the differential of the output of said second video detector;
a switch driver for providing an output in response to said first differentiator and in response to said second differentiator; and
a switch for selectively connecting said oscillator to said down-converting means and to said oscillator amplifier in response to the output of said switch driver.

11. A method for providing a transmitted signal in response to a received signal, said method comprising:
providing a heterodyning signal;
down-converting the received signal by a harmonic of the heterodyning signal to provide an intermediate frequency signal;
delaying the propagation of said intermediate frequency signal for a predetermined time;
up-converting the intermediate frequency signal by a harmonic of the heterodyning signal to provide the transmitted signal having a frequency which is substantially equal to the frequency of the received signal; and
switching the heterodyning signal in response to the propagation of said intermediate frequency signal to prevent said transmitted signal from appearing as a received signal.

* * * * *